Figure 1:
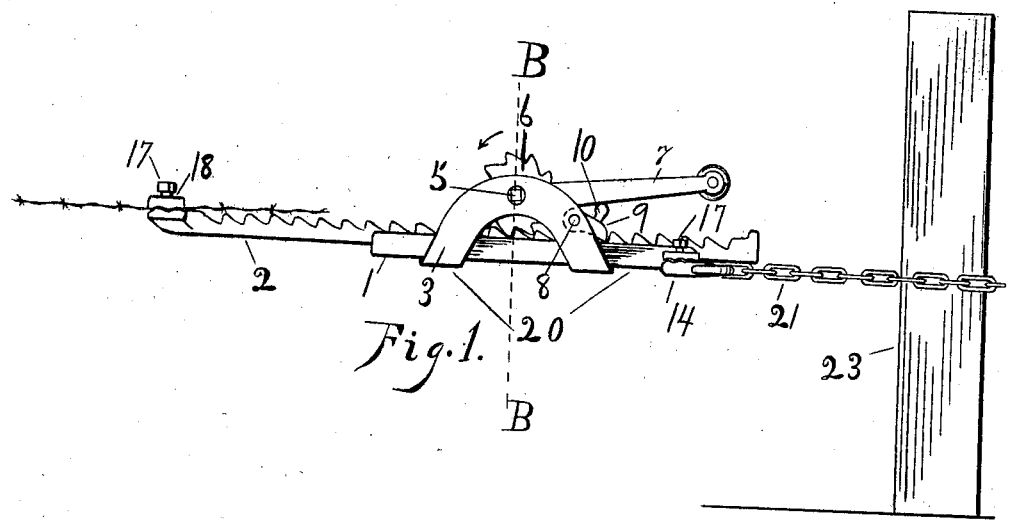

No. 838,059. PATENTED DEC. 11, 1906.
O. T. SHIPP.
WIRE STRETCHER.
APPLICATION FILED MAR. 26, 1906.

WITNESSES:
J. E. Courtright
W. H. Logue

INVENTOR
Orrin T. Shipp
By P. L. Courtright
his Attorney

UNITED STATES PATENT OFFICE.

ORRIN T. SHIPP, OF INDEPENDENCE, KANSAS.

WIRE-STRETCHER.

No. 838,059.  Specification of Letters Patent.  Patented Dec. 11, 1906.

Application filed March 26, 1906. Serial No. 307,962.

*To all whom it may concern:*

Be it known that I, ORRIN T. SHIPP, a citizen of the United States, residing at Independence, in the county of Montgomery and State of Kansas, have invented certain new and useful Improvements in Wire-Stretchers, of which the following is a specification.

My invention relates to improvements in wire-stretchers, and has for an object to provide a stretcher which shall be simple in construction, economical in cost, and thoroughly efficient and practical in operation; and with this end in view the invention consists of certain novel constructions and combinations of parts, as will be hereinafter described, and pointed out in the claims.

Reference will be had to the accompanying drawings, which form a part of this specification, and in which the same reference characters indicate the corresponding parts in the different figures.

Figure 2:
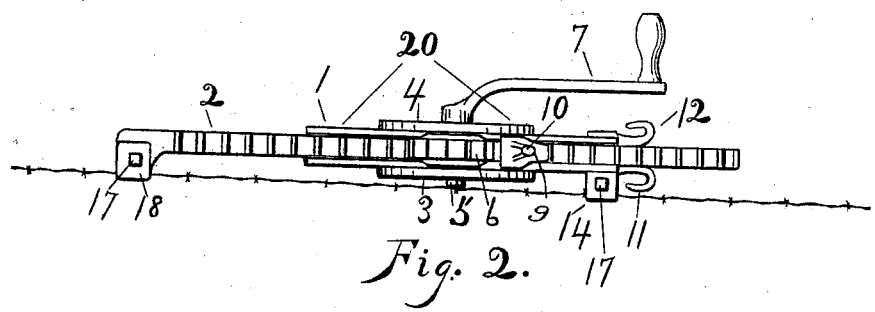
Figure 3:
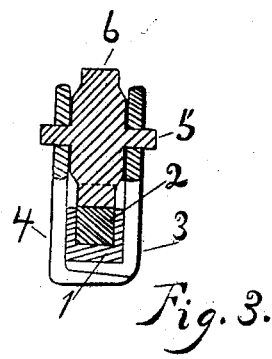

Figure 1 is a side elevation of my improved wire-stretcher. Fig. 2 is a top plan view of the same. Fig. 3 is a section taken on line B B of Fig. 1.

My improved stretcher is provided with a suitable frame 20, consisting of a grooved bar 1 and arch-shaped bars 3 and 4, rising one upon each side of the said grooved bar and rigidly secured thereto by rivets. In the groove of the bar 1 is slidably mounted the rack-bar 2. Said rack-bar travels endwise in the said groove, which serves as a longitudinally-extended guide for the said rack-bar.

Journaled in the upper part of the arch-shaped bars 3 and 4 is a shaft or spindle 5, to which is secured the gear or pinion 6, arranged to mesh with the cogs of the rack-bar 2. The ends of the spindle 5 are made square and adapted to receive the hand-crank 7 for the purpose of operating pinion 6 to cause the rack-bar 2 to move longitudinally in the stretcher-frame. Near the rear part of the arch-shaped bars 3 and 4, pivotally mounted upon the spindle 8, is the dog 9. Said dog is adapted to engage the rack-bar 2 and lock said rack-bar against sliding in one direction, but permit said rack-bar to slide freely in the opposite direction. Dog 9 is provided with a handle or knob 10, whereby said dog may be lifted when it is desired to return the rack-bar 2 to its original left-hand or forward position.

The right-hand, (drawings Figs. 1 and 2,) or what may be called the "rear" end of the frame, is provided with hooks 11 12, said hooks being an integral casting attached to the bar 1 by means of a rivet.

When in use, the device may be secured to a post or other convenient support 23 by means of chain 21, connected with one of the said hooks and passed around said post and again connected with the same or with the opposite hook, as may be desired, to secure the proper position of the stretcher for wire-stretching purposes.

The stretcher-frame is provided with a wire-engaging clamp 14 at or near the end of the bar 1 and adjacent to the hook 11, the lower member of said clamp being preferably integral with the casting forming hooks 11 and 12. The upper member of said clamp is secured to the lower member by a threaded screw or bolt 17, which serves when tightened to draw the two members securely together upon the engaged wire. Both of the said members to further secure the wire against slipping have their engaging faces corrugated, with the ridges of one member opposing the grooves of the other, whereby the engaged wire is crimped and securely held. It will also be understood that bolt 17 may, if so desired, be provided with a handle integral with said bolt instead of a head adapted to receive a wrench, as shown in the drawings.

The end of the rack-bar 2 at the opposite or forward part of the stretcher is provided with a similar clamp 18. Rack-bar 2 is moved to the extreme forward or left-hand position and clamp 18 tightened upon the wire to be stretched. Hand-crank 7 is then turned in the direction indicated by the arrow Fig. 1, causing the pinion 6 to rotate, and thereby the rack-bar 2 to be moved toward the post. If the rack-bar has been moved to its farthest right-hand position and the wire is not sufficiently tight, the said wire is secured to clamp 14 and clamp 18 released. Bar 2 is returned to its original forward position and clamp 18 again tightened upon the wire (see Fig. 2) and clamp 14 released. The operation may be repeated until the wire is sufficiently tight.

When it is desired to unite two wires, rack-bar 2 is moved to its forward position and the end of one of the wires secured by clamp 18. The end of the other wire is then secured by clamp 14 and hand-crank 7 turned until the ends of said wires approach sufficiently for uniting.

Having thus described my invention, what I claim as new, and desire to secure by Letters Patent, is—

1. In a wire-stretcher, the combination of a stretcher-frame and a rack-bar, the stretcher-frame having as its base a grooved bar to guide the rack-bar which is slidably mounted therein, arch-shaped bars extending upward one upon each side of the said grooved bar, a spindle journaled in the said arch-shaped bars and provided with a hand-crank, a pinion upon the spindle meshing with the cogs of the rack-bar, a dog pivotally mounted in said arch-shaped bars and normally engaging the cogs of the rack-bar to lock it against movement in one direction, a knob upon said dog whereby it may be easily raised and disengaged from the rack-bar during the reverse movement of said rack-bar, a wire-engaging clamp upon one end of the said rack-bar, two hooks at the opposite end of the stretcher-frame on the first-mentioned grooved bar to permit connection with a stationary support, a wire-engaging clamp near said hooks on said grooved bar.

2. In a wire-stretcher, the combination of two coöperating members, one arranged to be connected with a stationary support, the other arranged to be connected with the wire to be stretched, one member being a stretcher-frame and the other a rack-bar, the stretcher-frame and rack-bar being connected in operative relation whereby the rack-bar is allowed to move in the stretcher-frame, the stretcher-frame consisting of a grooved bar in which the rack-bar slides, and arch-shaped bars rising one upon each side of the said grooved bar and rigidly secured thereto, a spindle journaled in the stretcher-frame, a pinion mounted on the spindle and engaging the cogs of the rack-bar, means for rotating the pinion, a dog pivotally mounted in the stretcher-frame and engaging the cogs of the rack-bar whereby the latter is locked against movement in one direction, means in a knob upon said dog whereby said dog may be held out of engagement with the rack-bar to permit the reverse movement of the latter, means for connecting the stretcher-frame with a suitable stationary support, means mounted on the rack-bar for holding the wire to be stretched, means mounted on the stretcher-frame for holding the wire during the reverse movement of the rack-bar.

In testimony whereof that I claim the above I have signed my name to this specification in the presence of two witnesses.

ORRIN T. SHIPP

Witnesses:
W. C. COURTRIGHT,
J. E. COURTRIGHT.